United States Patent
Kanouda et al.

(10) Patent No.: US 7,728,545 B2
(45) Date of Patent: Jun. 1, 2010

(54) EQUIPMENT WITH A BUILT-IN FUEL CELL

(75) Inventors: Akihiko Kanouda, Hitachinaka (JP);
Mutsumi Kikuchi, Hitachi (JP);
Hideaki Koyama, Higashimurayama (JP);
Eisaku Fujita, Chofu (JP);
Yasuaki Norimatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1255 days.

(21) Appl. No.: 11/204,345

(22) Filed: Aug. 16, 2005

(65) Prior Publication Data
US 2006/0035116 A1 Feb. 16, 2006

(30) Foreign Application Priority Data
Aug. 16, 2004 (JP) .............................. 2004-236275

(51) Int. Cl.
*H01M 10/44* (2006.01)
*H01M 10/46* (2006.01)

(52) U.S. Cl. .................... 320/101; 320/137; 320/138; 320/139

(58) Field of Classification Search .............. 320/101, 320/126, 137, 138, 139, 140, 134, 135, 136, 320/160, 161
See application file for complete search history.

(56) References Cited

U.S. PATENT DOCUMENTS

| 6,902,837 B2 * | 6/2005 | McCluskey et al. ............. 429/9 |
| 6,936,994 B1 * | 8/2005 | Gimlan ........................ 320/101 |
| 7,446,501 B2 * | 11/2008 | Aleyraz et al. ............... 320/101 |
| 2002/0055029 A1 * | 5/2002 | Hayashi et al. ................ 429/34 |
| 2003/0113599 A1 * | 6/2003 | Pearson ........................ 429/23 |
| 2004/0183501 A1 * | 9/2004 | Ozeki .......................... 320/101 |
| 2004/0202900 A1 * | 10/2004 | Pavio et al. .................... 429/9 |
| 2005/0077865 A1 * | 4/2005 | Durbin et al. ................ 320/101 |
| 2006/0035116 A1 * | 2/2006 | Kanouda et al. ............... 429/9 |

FOREIGN PATENT DOCUMENTS

| JP | 6-124720 | 5/1994 |
| JP | 2000-12059 | 1/2000 |
| JP | 2000-341881 | 12/2000 |
| JP | 2001-45677 | 2/2001 |
| JP | 2002-216782 | 8/2002 |
| JP | 2004-304974 | 10/2004 |
| JP | 2004-304977 | 10/2004 |
| JP | 2004-319367 | 11/2004 |

OTHER PUBLICATIONS

Office Action issued in Japanese Patent Application No. 2004-236275 on Jun. 26, 2007.
Office Action issued in Japanese Patent Application No. 2004-236275 on Oct. 23, 2007.

\* cited by examiner

*Primary Examiner*—Edward Tso
*Assistant Examiner*—Alexis Boateng
(74) *Attorney, Agent, or Firm*—Antonelli, Terry, Stout & Kraus, LLP.

(57) ABSTRACT

In equipment with a built-in fuel cell, there are provided a plurality of secondary cells, and each of the secondary cells has a first state in which an electric power is supplied to a load within the equipment, and a second state in which the electric power that is supplied from the fuel cell is charged, and the first state and the second state is selectively used. The present invention can provide the fuel cell-carried equipment that stably operates due to a power system on which a fuel cell and plural secondary cells are mounted.

16 Claims, 4 Drawing Sheets

| | ELECTRIC POWER SUPPLIED FROM AC ADAPTOR | ELECTRIC POWER GENERATED FROM DMFC | SUPPLY POWER TO LOAD | CHARGE CONTROL CIRCUIT 7a | CHARGE CONTROL CIRCUIT 7b | DIS-CHARGE SWITCH 8a | DIS-CHARGE SWITCH 8b | DIS-CHARGE SWITCH 8c | STATE CONTROL SIGNAL 17 | BOOST TYPE DC/DC CONVERTER 15 |
|---|---|---|---|---|---|---|---|---|---|---|
| DMFC DRIVE STATE 1 | NOTHING (NON-CONNECTION) | CHARGE Li BATTERY 18b | DISCHARGE FROM Li BATTERY 18b | OFF | ON | OFF | ON | OFF | ON | ON |
| DMFC DRIVE STATE 2 | NOTHING (NON-CONNECTION) | CHARGE Li BATTERY 18a | DISCHARGE FROM Li BATTERY 18a | ON | OFF | OFF | OFF | ON | ON | ON |
| Li BATTERY DRIVE STATE 1 | NOTHING (NON-CONNECTION) | NOTHING | DISCHARGE FROM Li BATTERY 18a | OFF | OFF | OFF | ON | OFF | ON | OFF |
| Li BATTERY DRIVE STATE 2 | NOTHING (NON-CONNECTION) | NOTHING | DISCHARGE FROM Li BATTERY 18b | OFF | OFF | ON | OFF | OFF | ON | OFF |
| AC CHARGE STATE | CHARGE Li BATTERY 18a CHARGE Li BATTERY 18b | NOTHING | FEED ELECTRICITY FROM AC ADAPTOR | ON | ON | OFF | OFF | OFF | OFF | OFF |

FIG. 3

EQUIPMENT WITH A BUILT-IN FUEL CELL

CLAIM OF PRIORITTY

The present application claims priority from Japanese application serial no. 2004-236275, filed on Aug. 16, 2004, the content of which is hereby incorporated by reference into this application.

FIELD OF THE INVENTION

The present invention relates to equipment that carries a fuel cell; the fuel cell comprises a membrane electrode assembly (MEA) having an anode, an electrolyte, a cathode, and a diffusion layer; and liquid fuel is oxidized by the anode and oxygen is reduced by the cathode.

BACKGROUND OF THE INVENTION

A fuel cell is an electric generator that is comprised of at least a solid or liquid electrolyte, and two electrodes consisting of an anode and a cathode which induce an electrochemical reaction. It directly converts a chemical energy of the fuel into an electric energy with a high efficiency. As the fuel, there is the used of fossil fuels, hydrogen that has been chemically converted from water, methanol, alkali hydride, hydrazine which are liquid or solution in the normal environments, or dimethyl ether which is a pressurized liquidized gas. As an oxidizer gas, air or oxygen gas is used.

The fuel is electromechanically oxidized in the anode, and oxygen is reduced in the cathode, to thereby produce an electric potential difference between both of those electrodes. In this situation, when a load is applied between both of those electrodes as an external circuit, ionic migration is generated in the electrolyte, and an electric energy is provided for the external load. Various fuel cells are greatly expected as a large-scaled generator system as substitute for fire power equipment, a small-scaled diffusion type cogeneration system, or an electric vehicle power supply as substitute for an engine dynamo. Thus, the fuel cells have been actively developed so as to put into practical use.

Among those fuel cells, attention has been paid to a direct methanol fuel cell (DMFC), a metal hydride fuel cell, and a hydrazine fuel cell as effective fuel cells for a downsized mobile or portable power supply because the volume energy density of the fuel is high. In particular, DMFC employing methanol that is readily dealt with and expected to be produced from biomass in the near future as fuel is an ideal power system.

Japanese Patent Laid-Open No. 2002-216782 discloses a hybrid system having a fuel cell and plural secondary cells that are connected in parallel with the fuel cell.

The fuel cell has a propensity that it takes a long time until stably supplying an electric power required for a load (for example, electronic equipment) after starting the fuel cell because the fuel cell is a generator that converts a chemical energy into an electric power.

In view of the above, an object of the present invention is to provide equipment that is stably operated by a power system by carrying a fuel cell and plural secondary cells.

SUMMARY OF THE INVENTION

To achieve the above object, according to the present invention, there is provided fuel cell-carried equipment having a plurality of secondary cells therein wherein each of the secondary cells has a first state in which an electric power is supplied to a load within the equipment, and a second state in which the electric power that is supplied from the fuel cell is charged, and the first state or the second state is selectively used.

With the above structure, the present invention can obtain equipment that is stably operated by the power system which carries the fuel cell and the plural secondary cells.

DETAILED DESCRIPTION OF THE PREFERRED EMBODIMENTS

Now, a description will be given in more detail of preferred embodiments of the present invention with reference to the accompanying drawings. The present invention is not limited to the following embodiments.

In the fuel cell using methanol as a fuel which is employed in this embodiment, an electric power is generated by directly converting a chemical energy of methanol into an electric energy by an electrochemical reaction indicated below. At an anode side, a supplied methanol aqueous solution reacts according to an expression (1), and dissociates into carbon dioxide gas, hydrogen ions and electrons (oxidization reaction of methanol).

$$CH_3OH + H_2O \rightarrow CO_2 + 6H^+ + 6e^- \tag{1}$$

The generated hydrogen ions move in the electrolyte from the anode side to the cathode side. Then, the moved hydrogen ions react with oxygen gas diffused from air and electrons on the cathode electrode according to an expression (2) to generate water (reduction reaction of oxygen).

$$6H^+ + 3/2 O_2 + 6e^- \rightarrow 3H_2O \tag{2}$$

Accordingly, all of electrochemical reactions with electric power generation are made such that methanol is oxidized by oxygen to generate carbon dioxide gas and water as represented by an expression (3), and a chemical equation is identical with that in the framing combustion of methanol.

$$CH_3OH + 3/2 O_2 \rightarrow CO_2 + 3H_2O \tag{3}$$

An open circuit voltage of a unit cell is about 1.2 V, and substantially 0.85 to 1.0 V due to an influence of the fuel that penetrates the electrolyte. Although the open circuit voltage is not particularly restricted, the voltage under the substantially load operation is selected from a range of about 0.2 to 0.6 V. Accordingly, in the case where the fuel cell is actually used as a power supply, the unit cells are connected in series so as to obtain a required voltage according to a demand of the load equipment. An output current density of the unit cell varies according to the electrode catalyst, the electrode structure, or other influences. The unit cell is so designed as to effectively select the electric power generated area of the unit cell and obtain a required current. Also, it is possible to adjust the cell capacity by appropriately connecting the unit cells in parallel.

In this embodiment, a rated voltage of the unit cell is set to 0.3 V, and six unit cells are employed.

Because the fuel cell generates the electric power with the electrochemical reaction, it is necessary to compensate the operation of the load equipment in the case where it takes a long time to rise a supply electric power at the time of starting, the output drops at a low temperature, or the output is down at the time of running out of fuel. One of objects is to safely and surely operate mobile equipment even when the fuel cell is on such no good conditions.

To achieve the above object, there has been proposed that a secondary cell such as a lithium ion battery (hereinafter referred to as "Li battery") or a nickel hydride battery is mounted in the interior of a main body, the electric power is discharged to the load while an electric power from the fuel cell is charged to the secondary cell. However, this suffers from such problems that the charge/discharge management is complicated, and the circuit scale is large. Also, taking the fact that the internal Li battery is charged from an AC adaptor into consideration, the behavior of the fuel cell in this situation is an issue. That is, there is an issue that the Li battery within the main body is charged from AC or charged from the fuel cell.

According to an embodiment of the present invention described hereinafter, it can obtain a power system for stably driving a load while maximizing the utilization of the electric power from the fuel cell even if the output of the fuel cell is instable.

In this embodiment, two or more Li batteries are first prepared. The number of such secondary cells may be three or more. However, it is preferable to prepare two secondary cells in the case where the size of the power system is restricted as in the case of portable use. Also, it is preferable to prepare three or more secondary cells in the case where the output of a certain degree is demanded. It is preferable that the number of secondary cells is even because control is easy in the case where paired secondary cells that are in the charge state and paired secondary cells that are in the discharge state are identical in capacity with each other.

One of the Li batteries is connected to the fuel cell so as to be charged, and another Li battery is connected to a load so as to be discharged. The remaining amounts of these Li batteries are managed by current integral, respectively. In the case where the remaining amount of Li battery at the discharge side becomes zero, or in the case where the remaining amount of Li battery at the charge side becomes fully charged, the Li battery at the charge side and the Li battery at the discharge side are switched over to each other by an electric circuit, and the operation then continues. In this situation, the discharge to the load side is changed with overlapping the discharge routes from the plural Li batteries with each other so as not to shut off the electric power supply to the load.

Also, in the case where the voltage of the fuel cell is equal to or lower than a required value, it is determined as the deterioration of the output of the fuel cell, and the charge of the Li battery stops.

Also, during the night where the equipment is not used, an AC/DC adaptor is connected to the equipment to stop charge of the Li battery from the fuel cell, and to charge the plural Li batteries with an electric power inputted from the AC/DC adaptor at the same time. As a result, the charge operation can be carried out at a high speed.

In addition, a converter having a function of limiting the output current of the fuel cell to a predetermined value or lower is connected to an output side of the fuel cell to manage the output current. Also, a thermistor is attached to the fuel cell. When overheating of the fuel cell is detected by the thermistor, the output current of the fuel cell is limited or shut off by converter.

The capacity of each secondary cell is indicated as, for example, 1.8 Ah. This means that the secondary cell is fully charged by charging the secondary cell with a current of 1.8 A for one hour. A current that performs full charge in one hour is expressed by 1 c. As a method of charging the Li battery, a constant current of 0.5 c to 1 c is generally allowed to flow into the secondary cell to carry out a constant-current charge, and the constant-current charge is switched over to a constant-voltage charge that holds the voltage constant at the time where the voltage reaches 4.20 V. Then, it is determined as the full charge at the time where the current flowing in the secondary cell by the constant-voltage charge becomes about 0.01 c or lower. The same charging method is applied to the nickel hydride battery, but the voltage of transition from the constant-current charge to the constant-voltage charge is 1.4V.

Figure 1:
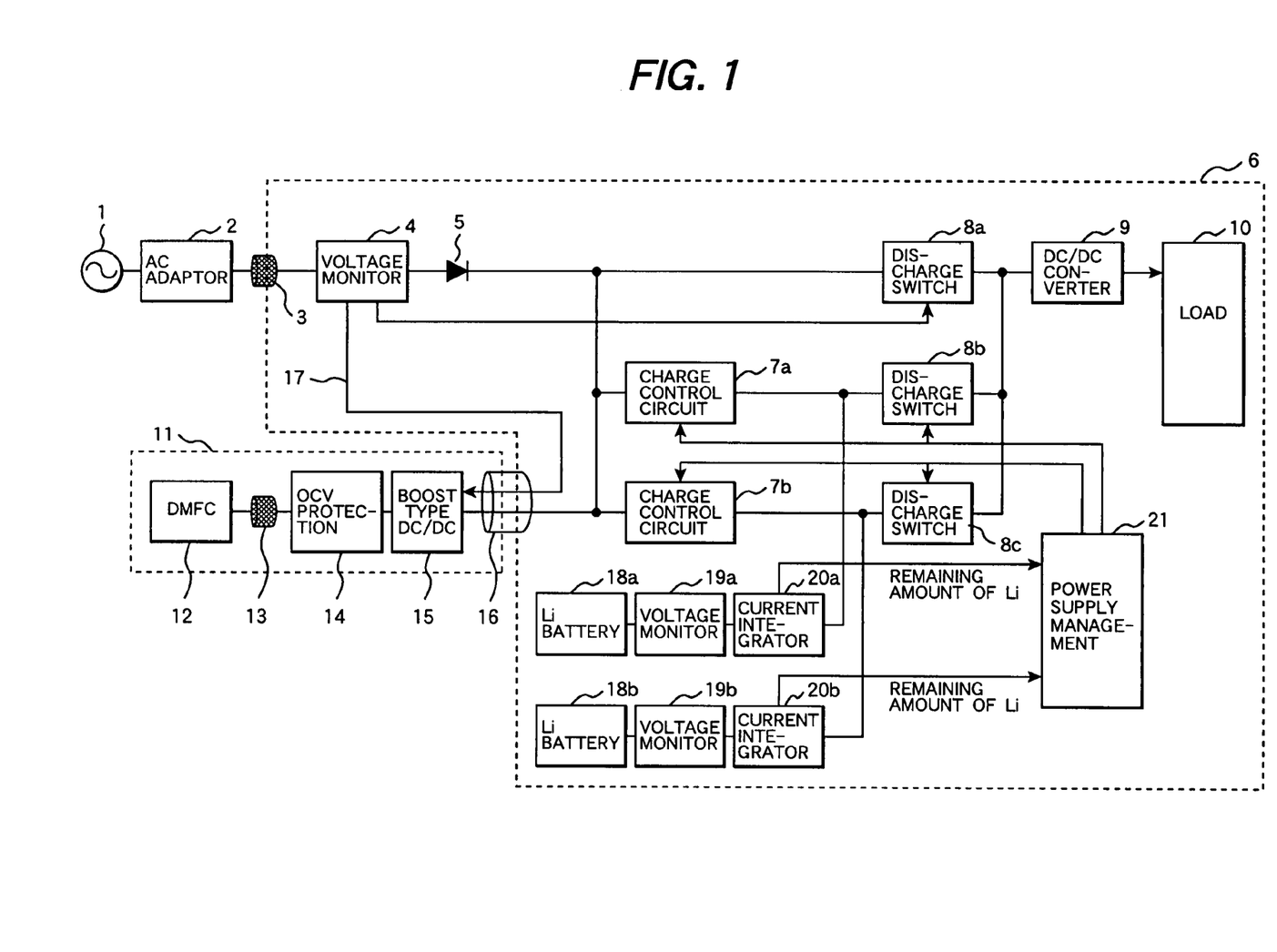
FIG. 1 is a diagram showing the structure of overall fuel cell-carried information equipment according to the present invention.
Figure 2:
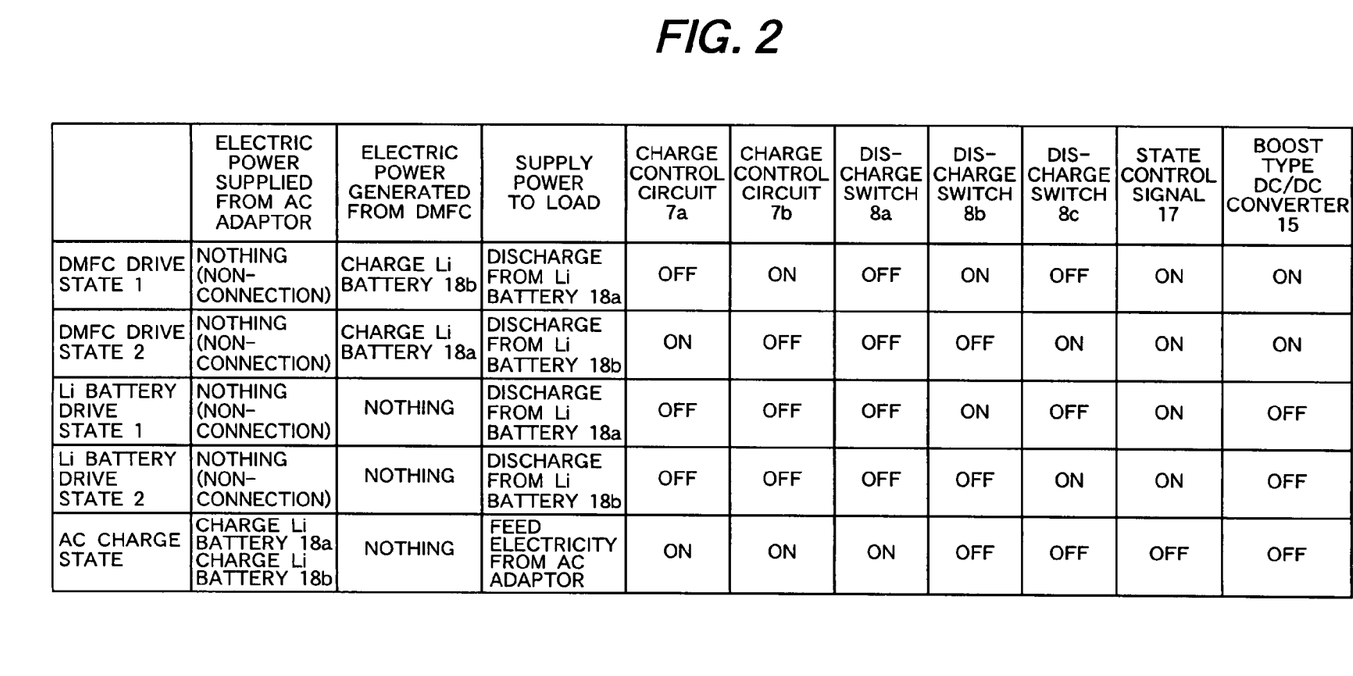
FIG. 2 is a table showing states of a power supply path and a charge control/discharge SW in the respective operating states.

A first embodiment of the present invention will be described in detail with reference to FIGS. 1 and 2. FIG. 1 is a diagram showing the entire structure of fuel cell-carried information equipment according to this embodiment.

Referring to FIG. 1, Li batteries 18a and 18b are disposed in a mobile equipment main body 6. Those batteries may be formed of other batteries such as nickel hydride batteries or nickel cadmium batteries. The Li batteries 18a and 18b are connected with voltage monitor circuits 19a and 19b, respectively, and input/output paths of the Li batteries are connected with current integrator circuits 20a and 20b, respectively. The outputs of the current integrator circuits 20a and 20b are outputted to a power supply management circuit 21. Also, the input sides of the Li batteries 18a and 18b are connected with charge control circuits 7a and 7b, respectively, to control the charge current and voltage. The output sides of the Li batteries 18a and 18b are connected with discharge switches 8a, 8b, and 8c, and those discharge switches 8a to 8c are switched over to select a power supply that is supplied to a DC/DC converter 9. It is optimum to use power MOSFETs that are relatively low in the on resistance as the discharge switches 8a to 8c, but another means such as a relay may be used instead. An output of the DC/DC converter 9 is supplied to a load 10. The mobile equipment main body 6 has a connector 3 that connects an AC adaptor 2 and a connector 16 that connects a fuel cell unit 11.

ADMFC 12 is disposed in the fuel cell unit 11, and connected to an OCV (open circuit voltage) protection circuit 14 through a connector 13. The connector 13 is so disposed as to simply make plug-in or plug-out of wiring between the DMFC 12 and the OCV protection circuit 14 at the time of maintaining or exchanging the DMFC main body. The OCV protection circuit 14 is so disposed as to prevent the boost type DC/DC converter and the mobile equipment main body 6 from being destroyed by OCV formed when DMFC becomes in an electric power generating state in a non-load state. The boost type DC/DC converter 15 boosts the output voltage of the DMFC 12 and conducts stabilization. The number of tandem cells of the DMFC in this embodiment is 8, and the output voltage of the boost type DC/DC converter 15 is about 5.0 V.

First, a DMFC drive state 1 shown in FIG. 2 will be described. In this state, the AC adaptor 2 is not connected to the connector 3, and the fuel cell unit 11 is connected to the connector 16. As shown in FIG. 2, in this state, a state control signal 17 is on because no AC adaptor is provided, and the boost type DC/DC converter 15 is in an operating state in the mobile equipment main body 6. Also, because the charge control circuit 7b is on, and the charge control circuit 7a is off, the electric power from the fuel cell unit 11 which is supplied through the connector 16 is charged to the Li battery 18b through the charge control circuit 7b. In this situation, the charge current and time are measured in detail by the current integrator circuit 20b. The remaining amount of the Li battery 18b is calculated from those information by the power supply management circuit 21. On the other hand, in this state, the discharge switch 8b is on, and the Li cell 18a is connected to the DC/DC converter 9 through the discharge switch 8b. The electric charges in the Li battery 18a are discharged to the load 10 through that path. The output current of the Li battery 18a is detected by the current integrator circuit 20a, and managed by the power supply management circuit 21.

Subsequently, a DMFC drive state 2 will be described. It is assumed that the condition of transition from the DMFC drive state 1 to the DMFC drive state 2 is a case in which the remaining amount of Li battery 18a is reduced in the DMFC drive state 1, or a case in which the remaining amount of Li battery 18b is fully charged. In those cases, the states of the Li batteries 18a and 18b are perceived by the power supply management circuit 21. Then, the charge control circuit 7b is first turned off, and the discharge switch 8c is turned on to ensure a discharge path extending from the Li battery 18b to the DC/DC converter 9. Then, the discharge switch 8b is turned off to shut off the discharge from the Li battery 18a, and the operation of the charge control circuit 7a is turned on. Because the AD adaptor is not connected, the state control signal 17 is on, and the Li battery 18a is charged with the electric power from the fuel cell unit 11 through the boost type DC/DC converter 15 and the charge control circuit 7a.

In the normal use state, the states of the DMFC drive states 1 and 2 are selectively used while the states of the Li batteries 18a and 18b are monitored.

The remaining amounts of Li batteries 18a and 18b are readily managed because the charge state and the discharge state are always clearly separated, and the Li batteries can be safely used without any problem. Also, because there is no direct electric power path extending from the DMFC to the load, the state of the DMFC does not directly affect the load, thereby making it possible to stably drive the equipment.

Subsequently, the Li battery drive state 1 will be described. This state is a state that may occur in the case where no AC adaptor is connected, and the fuel cell unit 11 is not connected, or the output voltage from the DMFC is low, and electricity cannot be fed even if the fuel cell unit 11 is connected. In the case where the output from the DMFC is insufficient, for example, the terminal voltage of the DMFC is lower than 0.7 V, the boost type DC/DC converter 15 is turned off, and the output of the fuel cell unit 11 is set to zero. In this situation, as shown in FIG. 2, the state control signal 17 is on, but the boost type DC/DC converter 15 is off, the charge control circuits 7a and 7b are off, the discharge switches 8a and 8c are off, and the discharge switch 8b is on. In this state, the electric power is supplied to the load 10 from the Li battery 18a through the DC/DC converter 9.

As described above, in this embodiment, even if the output of the fuel cell is rapidly dropped, there is no influence of the dropped output on the load, thereby making it possible to stably drive the load.

Subsequently, the Li battery drive state 2 will be described. This state is a state that may occur in the case where there is no remaining amount of Li battery 18a in the above Li battery drive state 1. In this state, the discharge switch 8c is turned on while the discharge switch 8b is kept on, and the discharge switch 8b is turned off after a discharge path extending from the Li battery 18b to the DC/DC converter 9 is established. In this way, the electric power of the Li battery 18b is supplied to the load.

Subsequently, when the mobile equipment main body 6 is not used, for example, during the night, the Li batteries are charged from a commercial AC. This state is an AC charge state shown in FIG. 2. In this situation, the AC adaptor 2 is connected to a commercial power supply 1, and connected to the mobile equipment main body 6 through the connector 3. Within the mobile equipment main body 6, the input voltage is recognized by the voltage monitor circuit 4, and the state control signal 17 is turned off, as a result, the boost type DC/DC converter 15 stops, and an electric power from the DMFC is not inputted to the mobile equipment main body 6. As shown in FIG. 2, in this state, the charge control circuits 7a and 7b are on, the discharge switch 8a is on, and the discharge switches 8b and 8c are off. Then, the electric power that has been inputted from the AC adaptor 2 is inputted to the charge control circuits 7a and 7b through a diode 5 to charge the Li batteries 18a and 18b, respectively. On the other hand, the electric power is supplied to the load 10 through the discharge switch 8a and the DC/DC converter 9. In this state, the load is in a sleep state, and the input power from the AD adaptor is mainly supplied to charge the Li batteries 18a and 18b.

Since the Li batteries 18a and 18b are optimally charged while the states of the batteries are watched by the dedicated charge control circuits 7a and 7b, the battery management is easy, no deterioration occurs, and there is no fear that the batteries are overcharged.

Also, this state is a state in which the electric power from the AC adaptor can be supplied even if both of the Li batteries 18a and 18b are completely discharged, and this state makes it possible to always implement the maintenance of the main body.

Figure 3:
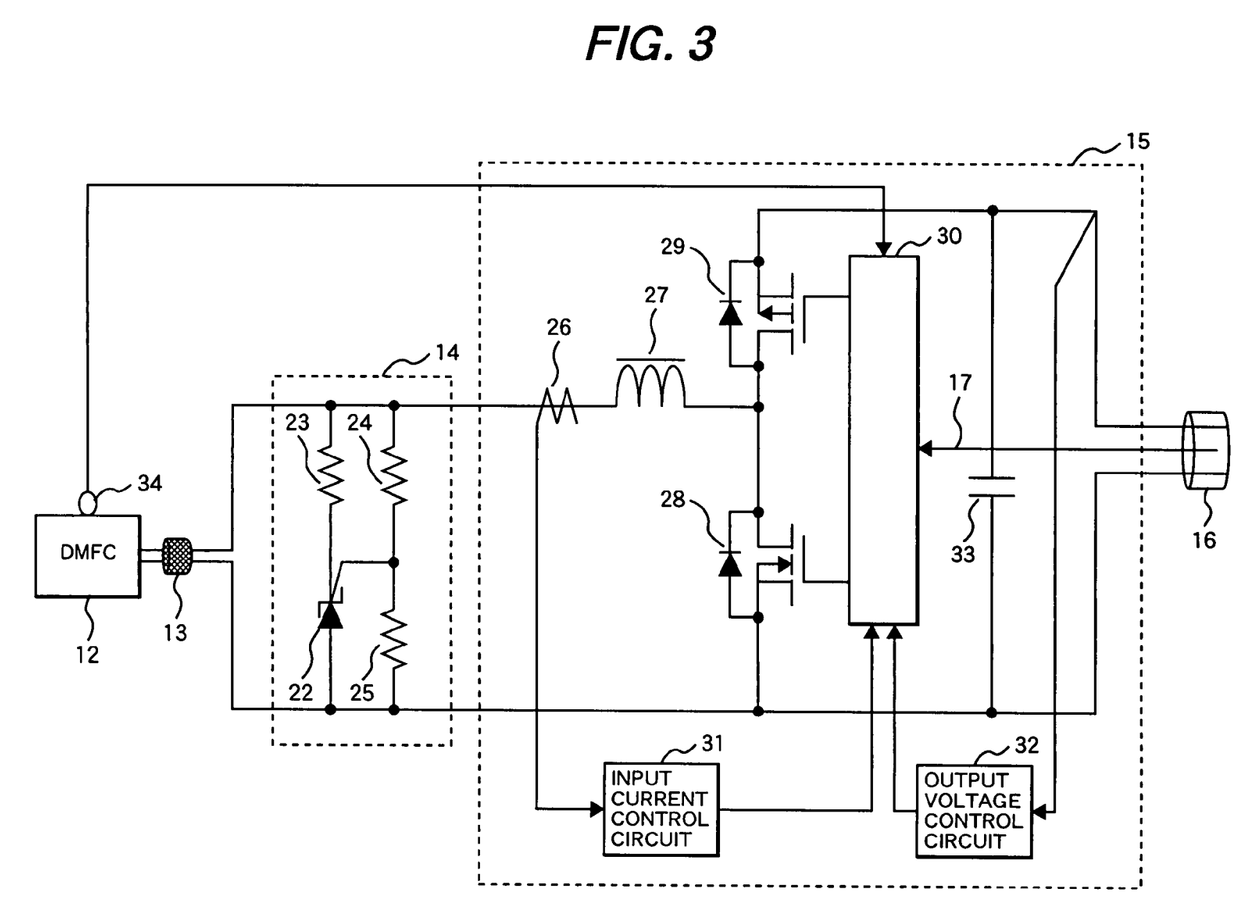
FIG. 3 is a diagram showing an internal structure of a fuel cell unit.
Figure 4:
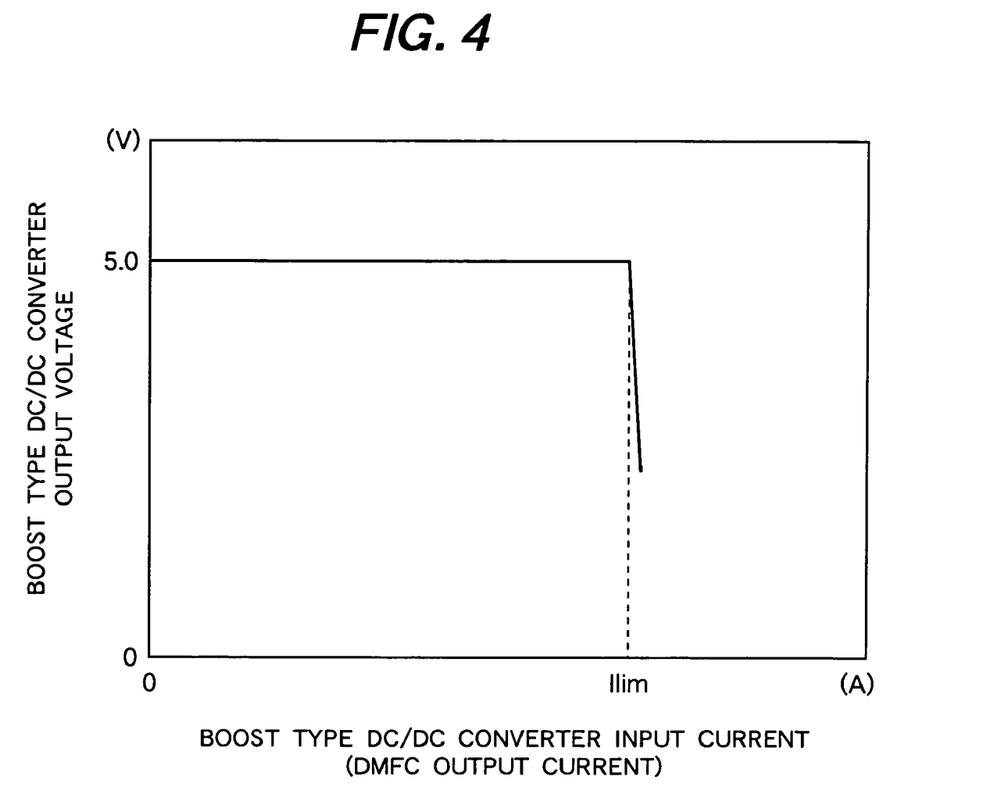
FIG. 4 is a graph showing an input and an output of a boost type DC/DC converter.

Subsequently, a second embodiment of the present invention will be described with reference to FIGS. 3 and 4 as well as FIG. 1. FIG. 3 shows the details of the internal structure of the fuel cell unit 11 in the circuit structure shown in FIG. 1. The structure of this embodiment will be described. A DMFC 12 is connected with a thermistor 34, and the output of thermistor 34 is inputted to a boost type converter control circuit 30. The DMFC 12 is connected to an OCV protection circuit 14 through a connector 13. The OCV protection circuit 14 is comprised of a shunt regulator 22, and resistors 23, 24 and 25. The OCV protection circuit 14 is connected to a boost type DC/DC converter 15. The boost type DC/DC converter 15 is comprised of an n-channel power MOSFET 28, a p-channel power MOSFET 29, an inductor 27, a smoothing capacitor 33, a boost type converter control circuit 30, a current sensor 26, an input current control circuit 31, and an output voltage control circuit 32. The boost type DC/DC converter 15 is connected to a mobile equipment main body 6 shown in FIG. 1 through a connector 16.

Subsequently, the operation will be described. The output voltage of the DMFC 12 is compared with a reference voltage of the shunt regulator 22 by using a division ratio of resistors 24 and 25. In the case where the output voltage of the DMFC 12 is equal to or lower than a predetermined value, no current flows in a resistor 23 because an impedance of the shunt regulator 22 is very high. However, when the open circuit voltage (OCV) of the DMFC 12 becomes equal to or higher than a predetermined value, the impedance of the shunt regulator 22 is rapidly lowered, and a current flows in the resistor 23. The current to voltage characteristic of the DMFC 12 has such a characteristic that the open circuit voltage is high when the current is zero whereas the voltage is greatly lowered when even a small current flows. As a result, the structure of this circuit makes it possible to hold the output voltage of the DMFC 12 to a predetermine value or lower, not depending on the state of the mobile equipment main body 6. Accordingly, the boost type DC/DC converter 15 or the mobile equipment main body 6 can be prevented from being damaged due to a rise of the open circuit voltage.

Subsequently, a method of controlling the boost type DC/DC converter 15 will be described. The boost type DC/DC converter 15 transfers an energy that has been stored in the inductor 27 at the time of turning on the n-channel power MOSFET 28 to the smoothing capacitor 33 at the time of turning on the p-channel power MOSFET 29 by alternately switching over the n-channel power MOSFET 28 and the p-channel power MOSFET 29, and rises the output voltage due to the input voltage of the converter.

In this embodiment, the output voltage of the boost type DC/DC converter is set to 5 V. The converter feeds the voltage across the smoothing capacitor 33 back to the output voltage control circuit 32, and controls the output voltage to be constant, that is, 5 V. On the other hand, a current that flows in the inductor 27 is detected by the current sensor 26, and then inputted to the input current control circuit 31. The input current control circuit 31 generates no output in the case where the current is equal to or lower than a predetermined current value (Ilim). The boost type converter control circuit 30 operates due to the output of the above output voltage control circuit 32, and controls the on-time ratio of the respective gate circuits of the n-channel power MOSFET 28 and the p-channel power MOSFET 29.

However, when the current of the current sensor 26 exceeds the given value (Ilim), the output of the input current control circuit 31 is changed. Then, the boost type converter control circuit 30 gives preference to the output of the input current control circuit 31 over the output of the output voltage control circuit 32, and operates so as to constantly limit the input current to Ilim. FIG. 4 is a graph showing the above operation state in which a boost type DC/DC converter-input current, that is, a DMFC-output current is expressed by the axis of abscissa, and a boost type DC/DC converter-output voltage is expressed by the axis of ordinate. This means that the output voltage can be made to droop due to the input current. As a result, the output current of the DMFC can be always suppressed to a predetermined value or lower, a phenomenon such as the output deterioration attributable to air bubbles within the DMFC, the dew condensation on an air electrode due to an increase in the accompanied water, or water leakage is prevented, thereby making it possible to stably use the fuel cell for a long period of time.

In the control system according to this embodiment, because the current of the DMFC is limited by the input current control circuit 31, the current cannot follow a change in the load 10 of the mobile equipment main body 6, and stable operation cannot be performed in the simple circuit structure of the DMFC-DC/DC converter load. However, in this embodiment, as shown in FIG. 1, because a direct load of the DMFC is always the Li battery, and the load 10 is connected to another Li battery, there is no influence of the output current limit of the DMFC on the load 10.

Subsequently, the temperature protection function will be described. The DMFC 12 has the above current limit function, and always operates at a stable operation point. As the thermistor 34 is in contact with the DMFC 12 and detects the temperature, if the DMFC 12 is overheated and becomes equal to or higher than a predetermined temperature, the temperature information is inputted to the boost type converter control circuit 30 to stop the switching of the boost type DC/DC converter 15, and the operation is shutdown. The temperature protection function has hysteresis, and the operation is automatically restarted when the DMFC 12 is sufficiently cooled due to the operation stop.

In this embodiment, the p-channel power MOSFET can be realized by a Schottky barrier diode, and an n-channel power MOSFET can be used depending on the structure of the boost type converter control circuit 30. It is needless to say that another power semiconductor device may be used. Also, the shunt regulator 22 can be structured by a general comparator and the reference power supply. The current sensor 26 can be realized by various means, for example, the current is detected by using the shunt resistor as well as a hole element or a sense MOSFET equipped in the n-channel power MOSFET 28. Also, the insertion position of the current sensor 26 may be disposed at the ground side, that is, between the source electrode of the n-channel power MOSFET 28 and the ground side of the resistor 25, other than the input side of the inductor 27. Also, in FIG. 3, the boost type DC/DC converter 15 is connected to the post stage of the OCV protection circuit 14. The same circuit structure is applied, even if the boost type DC/DC converter 15 is connected directly to the output terminal of the DMFC 12 and the OCV protection circuit is connected to a connection point thereof in parallel.

Similarly, in the overheat of the DMFC, the same operation as that of the input current control circuit may be applied to limit the output voltage of the DC/DC converter.

According to this embodiment, the load equipment can be stably driven, not depending on the state of the fuel cell. Also, it is possible to efficiently charge the Li battery from AC. In this situation, dedicated control that the output from the fuel cell becomes automatically zero is conducted. Accordingly, it is unnecessary that a user conducts the on/off operation of the fuel cell at the time of AC charging each time. Thus, usability is improved. Also, in this embodiment, because the charge control circuit, the voltage monitor circuit, and the current integrator circuit are provided for each of the plural Li batteries, the state of each Li battery is detected in detail, grasped, and can be finely managed. As a result, the deterioration of the Li battery is suppressed, and the exchange cycle of the Li battery can be elongated, which can contribute to the low running costs.

On the other hand, because the output current of the fuel cell is limited to a predetermined value or lower, the fuel cell is prevented from being deteriorated, and the production of water from the electrode, or overheating is prevented so as to safely use the fuel cell. If the fuel cell is abnormally overheated, the fuel cell can be safely used because the protection function is provided.

As a result, when a large amount of mobile equipment on which the fuel cells are mounted are operated for a long period of time, there can be provided a preferable system.

What is claimed is:

1. An equipment with a built-in fuel cell, comprising:
 a load to be supplied with electric power;
 an AC adaptor connectable to a power source to supply electric power for the load;
 a fuel cell for supplying electric power to the load;
 two or more secondary cells arranged in parallel to supply electric power for the load;
 a protection circuit arranged to maintain an open circuit voltage of the fuel cell below a predetermined value;
 a boost type DC/DC converter arranged to boost an output voltage from the fuel cell via the protection circuit; and
 two or more discharge switches arranged in parallel to discharge electric power from the secondary cells to the load selectively when the discharge switches are turned on selectively, wherein the fuel cell, the protection circuit and the boost type DC/DC converter are connected in series in the order presented; an output side of the booster type DC/DC converter and an output side of the AC adaptor are connectable in parallel; each of the discharge switches is connected to the load in series on the output sides of the AC adaptor, the booster type DC/DC converter, and the secondary cells, wherein the equipment further comprises plural parallel electric power supply lines each of which connects each of the discharge switches between each of the secondary cells and the load in series, and each of which also connects each of the secondary cells to the output side of the booster type DC/DC converter and the output side of the AC adapter in parallel, wherein the booster type DC/DC converter is configured to be turned off when the AC adaptor is connected to the power source thereby outputting the electric power from the AC adaptor to the load and when the output voltage of the fuel cell is below the predetermined value, wherein each of the secondary cells connected to the discharge switches is configured to have a first state in which the electric power from the secondary cell is supplied to the load, and a second state in which the electric power from the fuel cell is charge to the secondary cell, and wherein the first state and the second state are selectively used.

2. The equipment with a built-in fuel cell according to claim 1, wherein each of the secondary cells is used so that the first state and the second state are charged mutually.

3. The equipment with a built-in fuel cell according to claim 2, wherein some of the secondary cells are in a charge state in which the electric power is supplied to the secondary cells from the fuel cell, and the charge state is switched over to a discharge state when the secondary cell that is in the charge state is fully charged.

4. The equipment with a built-in fuel cell according to claim 1, further comprising a plurality of charge control means that charge the secondary cells by a DC current that has been rectified and smoothed from a commercial AC power supply at the same time.

5. The equipment with a built-in fuel cell according to claim 4, wherein, when the AC adaptor is connected to the power source and thereby the electric power from the AC adaptor is supplied to the load, the electric power from the AC adaptor is also supplied to the secondary cells to charge the secondary cells.

6. The equipment with a built-in fuel cell according to claim 1, further comprising means for continuing the operation of the equipment by the electric power from the secondary cells while stopping the charging of the secondary cells when an output voltage of the fuel cell becomes the predetermined value or lower on condition that the AC adapter is not connected to the load.

7. The equipment with a built-in fuel cell according to claim 1, wherein the booster type DC/DC converter has a control function for restricting an output current of the fuel cell to the predetermined value or lower.

8. The equipment with a built-in fuel cell according to claim 1, wherein, when the AC adaptor is not connected to the load and thereby the electric power from the AC adaptor is not supplied to the load, the electric power is supplied to the load from any one of the secondary cells, the other of the secondary cells is charged with the electric power from the fuel cell, and any one of the secondary cells that supplies the electric power to the load is changed alternately.

9. The equipment with a built-in fuel cell according to claim 1, further comprising means for restricting an output current from the fuel cell when a temperature of the fuel cell exceeds the predetermined value.

10. An equipment with a built-in fuel cell, comprising:
a load to be supplied with electric power;
an AC adaptor connectable to a power source to supply electric power for the load;
a fuel cell for supplying electric power to the load;
two secondary cells arranged in parallel to supply electric power for the load;
a protection circuit arranged to maintain an open circuit voltage of the fuel cell below a predetermined value;
a boost type DC/DC converter arranged to boost an output voltage from the fuel cell, via the protection circuit; and
two discharge switches arranged in parallel to discharge electric power from the secondary cells to the load selectively when the discharge switches are turned on selectively, wherein the fuel cell, the protection circuit and the boost type DC/DC converter are connected in series in the order presented; an output side of the booster type DC/DC converter and an output side of the AC adaptor are connectable in parallel; each of the discharge switches is connected to the load in series on the output sides of the AC adaptor, the booster type DC/DC converter, and the secondary cells, wherein the equipment further comprises two parallel electric power supply lines each of which connects each of the discharge switches between each of the secondary cells and the load in series, and each of which also connects each of the secondary cells to the output side of the booster type DC/DC converter and the output side of the AC adaptor in parallel, wherein the booster type DC/DC converter is configured to be turned off when the AC adaptor is connected to the power source thereby outputting the electric power from the AC adaptor to the load and when the output voltage of the fuel cell is below the predetermined value, and wherein, when one of the secondary cells is in a discharge state, another secondary cell is in a charge state on condition that the AC adaptor is not connected to the load and thereby the electric power from the AC adaptor is not supplied to the load and when electric power from the fuel cell is outputted.

11. The equipment with a built-in fuel cell according to claim 10, wherein a charge state and a discharge state of the two secondary cells is changed to each other at a predetermined timing.

12. The equipment with a built-in fuel cell according to claim 10, wherein the predetermined timing is when one of the secondary cells that is in the charge state is fully charged.

13. A power supply system, comprising:
a DC/DC converter to supply electric power to a load;
an AC adapter connectable to a power source to supply electric power to the load, via the DC/DC converter;
a fuel cell for supplying electric power to the load, via the DC/DC converter, via the DC/DC converter;
two or more secondary cells arranged in parallel to supply electric power for the load, via the DC/DC converter;
a protection circuit arranged to maintain an open circuit voltage of the fuel cell below a predetermined value;
a boost type DC/DC converter arranged to boost an output voltage from the fuel cell, via the protection circuit; and two or more discharge switches arranged in parallel to discharge electric power from the secondary cells to the load selectively when the discharge switches are turned on selectively, wherein the fuel cell, the protection circuit and the boost type DC/DC converter are connected in series in the order presented; an output side of the booster type DC/DC converter and an output side of the AC adaptor are connectable in parallel; each of the discharge switches is connected to the DC-DC converter in series on the output sides of the AC adaptor, the booster type DC/DC converter, and the secondary cells, wherein the power supply system further comprises plural parallel electric power supply lines each of which connects each of the discharge switches between each of the secondary cells and the DC-DC converter in series, and each of which also connects each of the secondary cells to the output side of the booster type DC/DC converter and the output side of the AC adapter in parallel, wherein the booster type DC/DC converter is configured to be turned off when the AC adaptor is connected to the power source thereby outputting the electric power from the AC adaptor to the load and when the output voltage of the fuel cell is below the predetermined value, and wherein when one of the secondary cells is in a discharge state, another secondary cell is in a charge state on condition that the AC adaptor is not connected to the load and thereby electric power from the AC adaptor is not supplied to the load and when electric power from the fuel cell is outputted.

14. The power supply system according to claim 13, wherein, when the AC adaptor is connected to the power source and thereby the electric power from the AC adaptor is supplied to the load, the electric power from the AC adaptor is also supplied to the secondary cells to charge the secondary cells.

15. The power supply system according to claim 13, wherein, when the AC adaptor is not connected to the load and thereby the electric power from the AC adaptor is not supplied to the load, electric power is supplied to the load from any one of the secondary cells, the other of the secondary cells is charged with the electric power from the fuel cell, and any one of the secondary cells that supplies the electric power to the load is changed alternately.

16. The power supply system according to claim 13, wherein the booster type DC/DC converter has a control function for restricting an output current of the fuel cell to the predetermined value or lower.

* * * * *